United States Patent [19]

McLeod

[11] 4,002,607
[45] Jan. 11, 1977

[54] AZO DYES HAVING AN AMINO GROUP PARA TO THE AZO LINKAGE

[75] Inventor: John H. McLeod, Tonawanda, N.Y.

[73] Assignee: Allied Chemical Corporation, Morris Township, N.J.

[22] Filed: Oct. 25, 1974

[21] Appl. No.: 517,979

[52] U.S. Cl. .............................................. 260/198
[51] Int. Cl.² ......................................... C09B 43/08
[58] Field of Search .................................. 260/198

[56] References Cited

UNITED STATES PATENTS

| | | | |
|---|---|---|---|
| 2,092,143 | 9/1937 | Schweitzer | 260/198 X |
| 2,154,838 | 4/1939 | Fischer et al. | 260/198 |
| 2,243,213 | 5/1941 | Kranzlein et al. | 260/198 X |

Primary Examiner—Charles F. Warren
Attorney, Agent, or Firm—Anthony J. Stewart; Jay P. Friedenson

[57] ABSTRACT

Bright, bluish-red monoazo dyes having the formula

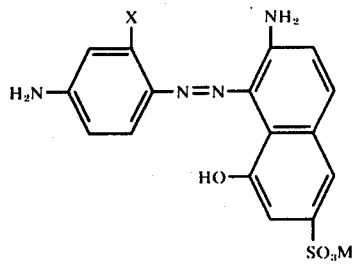

wherein X is Cl, Br or CN, and M is an alkali metal or hydrogen.

3 Claims, No Drawings

AZO DYES HAVING AN AMINO GROUP PARA TO THE AZO LINKAGE

This invention relates to dyestuffs. More particularly this invention relates to monoazo dyestuffs particularly suitable as red dyes for nylon articles.

The use of azo dyestuffs containing a sulfonic acid group for the dyeing of fibers, including artificial fibers such as nylon, has been known for some time. However, difficulty has been encountered in employing conventional red dyes in the dyeing of nylon fibers since many conventional dyes do not impart the desired lightfastness, shade, strength, etc. Furthermore, some of the known red dyes are sensitive to acid which is undesirable and results in unacceptable shade alterations. In addition, some monoazo dyestuffs employed heretofore for dyeing nylon articles a red shade have been considered uneconomical and undesirable since they are relatively expensive and produced from raw materials and processes which are in themselves relatively expensive.

It is therefore an object of this invention to provide a monoazo red dye suitable for nylon fibers.

It is a further object of this invention to provide an economical monoazo dyestuff which will dye nylon fibers bluish-red.

It is a still further object of this invention to provide a red nylon article having incorporated therein a monoazo dye which imparts to the article the desired lightfastness, shade, strength and which is non-sensitive to organic acid.

These and other objects will become apparent from the description which follows.

In accordance with this invention there is provided a monoazo dyestuff having the formula

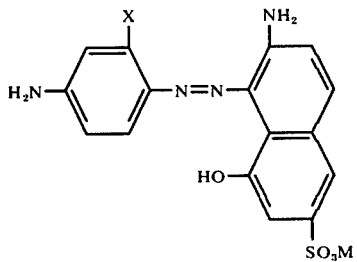

wherein X is —Cl, —BR or —CN and M is an alkali metal or hydrogen. Nylon fibers dyed with compounds of this invention exhibit good overall properties such as light-fastness, barré, staining, exhaust, water bleed and non-sensitivity to organic acids. The dyestuffs of this invention, when applied to nylon or wool, produce bright, bluish-red shades which are very pleasing to the eye.

It is believed that the amino group para to the azo linkage, in combination with the chloro, bromo or cyano group ortho to the azo linkage, provides brightness to the bluish-red dyestuffs of this invention and insensitivity of nylon dyed with these dyestuffs to organic acids, e.g. formic and acetic acids. Heretofore it was widely believed that amine groups, located at a position other than ortho to the azo linkage would easily be attacked by organic acids resulting in an alteration of the desired color shade. It has been found, however, that when fibers, e.g. nylon, are dyed with the dyes of this invention, organic acids do not attack the compound in such a way as to materially affect the color shade.

The dyestuffs of this invention are obtained by diazotizing a 4-nitro-2-substituted aniline, and coupling to Gamma acid or its alkali metal salts, and reducing the nitro group.

Suitable anilines which may be employed in the production of the dyestuffs of this invention may be represented by the formula

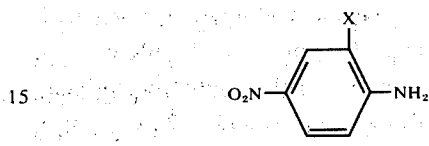

wherein X is —Cl, —Br or —CN.

Compounds falling within the above formula are: 4-nitro-2-chloro-aniline, 4-nitro-2-bromo aniline and 4-nitro-2-cyano aniline. The 4-nitro-2-chloro aniline is preferred.

The aniline is diazotized in the usual manner, e.g., with sodium nitrite, and thereafter coupled with Gamma acid, i.e., 2-amino-8-hydroxy naphthalene-6-sulfonic acid, or its alkali metal, i.e., lithium, sodium or potassium salts. Thereafter, the nitro group is reduced by the addition of a reducing agent such as an alkali metal sulfide. Nylon articles, preferably fibers, are dyed with the dyestuffs of this invention in a known manner, e.g., by immersing the fibers in a hot, aqueous solution of the dye. The articles so treated are bright, bluish-red and contain between 0.01 and 2.0, preferably 0.25 to 1.5 weight percent of the dye, depending on the shade desired, exhibit good lightfastness, barré and exhaust, and are non-sensitive to organic acids, that is, the shade is not measurably affected by exposure to an organic acid medium.

The dyestuffs of this invention are also especially suitable for blending with other dyes to obtain certain desired colors and/or shades. When so blended, the brightness characteristics of the dyes of this invention becomes a noticeable feature of the blended dyestuffs and articles treated therewith exhibit an appealing color along with the other desired dye characteristics.

The preferred dyestuff of this invention has the formula:

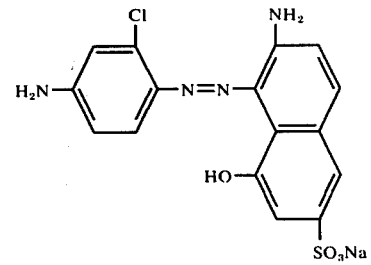

The invention will be more fully understood with reference to the following example which is given by way of illustration only.

EXAMPLE

To 315 cc.'s of water containing 20 drops of polyoxyethylene sorbitan monolaurate (surfactant) there is added 43.2 grams of 4-nitro-2-chloro aniline followed by 66 cc. of hydrochloric acid. The mixture is agitated for one-half hour and thereafter cooled to 0° C. by the addition of 200 grams of ice. 18.25 grams of sodium nitrite are added rapidly (1 to 2 minutes) and the mixture is agitated for 1 hour at 0° to 5° C. to affect complete diazotization. A small amount of sulfamic acid is then added to the diazo solution to remove any excess nitrous acid.

In the meantime a Gamma acid solution is prepared by adding 59.8 grams of Gamma acid to 800 cc.'s of water containing 5 drops of polyoxyethylene sorbitan monolaurate. To this solution is added 20 cc.'s of a 50% caustic soda solution to dissolve the Gamma acid.

The Gamma acid solution is added to the diazo solution over a one-half hour period while maintaining the temperature at 15° C. or below. This coupling solution is then agitated overnight without further temperature control.

15 cc.'s of a 50% caustic soda solution is added to the coupling solution which is thereafter heated to 85° C. A solution of 52 grams of 60% sodium sulfide chips in 103 cc.'s of warm water is added over one-half hour. Agitation is continued for an additional one-half hour to complete the reduction and the mixture is allowed to cool to 70° C., filtered and the filtrate is washed with 900 cc.'s of a 6% NaCl solution. The filter cake is then dried at 90° C. The yield is approximately 73.7 grams of a dyestuff identified as

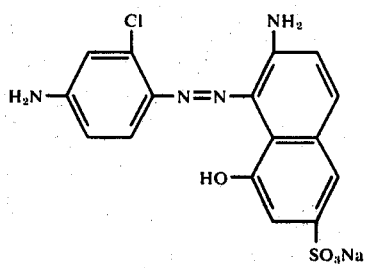

Nylon, which has been immersed in a hot aqueous solution of this dye exhibits a bright bluish-red color.

A particular advantage of this dyestuff is the fact that it can be used to efficiently dye nylon in a neutral medium and the use of an acid medium is not required.

I claim:
1. A monoazo dyestuff having the formula

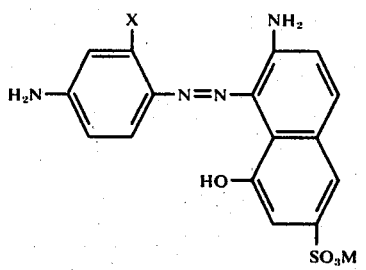

wherein X is Cl, Br or CN and M is an alkali metal or hydrogen.
2. The dyestuff of claim 1 wherein X is Cl.
3. The dyestuff of claim 1 wherein X is Cl and M is sodium.

* * * * *